Aug. 4, 1953     D. K. TWIET     2,647,490
COMBINED COMB AND POWDER APPLICATOR
Filed July 25, 1950

INVENTOR
*Daniel K. Twiet*
BY
*Richard W. Seed*

Patented Aug. 4, 1953

2,647,490

UNITED STATES PATENT OFFICE 2,647,490

COMBINED COMB AND POWDER APPLICATOR

Daniel K. Twiet, Juneau, Territory of Alaska, assignor to Plastichem Corporation, Seattle, Wash., a corporation of Washington Application July 25, 1950, Serial No. 175,743

2 Claims. (Cl. 119—86)

This invention relates to an animal comb devised in a manner which will admit of the dispensing of pyrethrum powder or other insecticide co-incident with the act of combing the animal's hair and deposit the dispensed powder upon the epidermis for destroying parasitic insects or vermin present thereon.

Several patents have been granted for combs particularly adapted to administer hair-dressing or scalp-treating liquids through hollow teeth from a syringe-type bulb, but such combs cannot be used efficiently and effectively to apply powder. Combs which are intended to dispense powder have appeared upon the market from time to time but they have enjoyed little if any acceptance by the purchasing public. This failure is attributable in large part to the fact that these prior combs, being unable to properly atomize and meter the powder, have been wasteful and delivered a marked surplusage of powder from the teeth. The lack of public acceptance is also accounted for in part by the fact that the ducts in the teeth through which the powder is dispensed become clogged in use by deposits picked up from the animal's skin and hair, such clogging being also frequently caused by the natural skin oil combining with the powder and causing the powder to cake in the teeth ducts.

Accordingly, it is a principal object of this invention to provide a combined comb and powder applicator of the type having hollow teeth wherein the powder is atomized and thoroughly mixed with air before reaching the teeth thereof.

It is a further object of the present invention to provide a comb of this nature whose teeth are not susceptible to clogging from external or internal causes and which admits of having the atomizing unit readily disassembled to make the same accessible for cleaning should any call therefor arise.

A further object is to devise a comb for this purpose whose parts can be easily and economically molded and assembled.

With the foregoing and other still more particular objects and advantages in view, the invention consists in the novel construction and in the adaptation and combination of parts hereinafter described and claimed.

Figure 1:
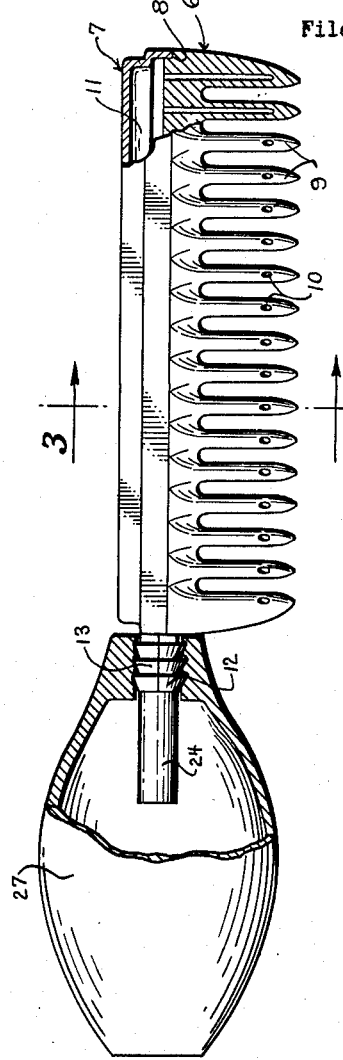
Figure 1 is a view partly in side elevation and partly in longitudinal vertical section of a comb embodying the teachings of the present invention.
Figure 2:
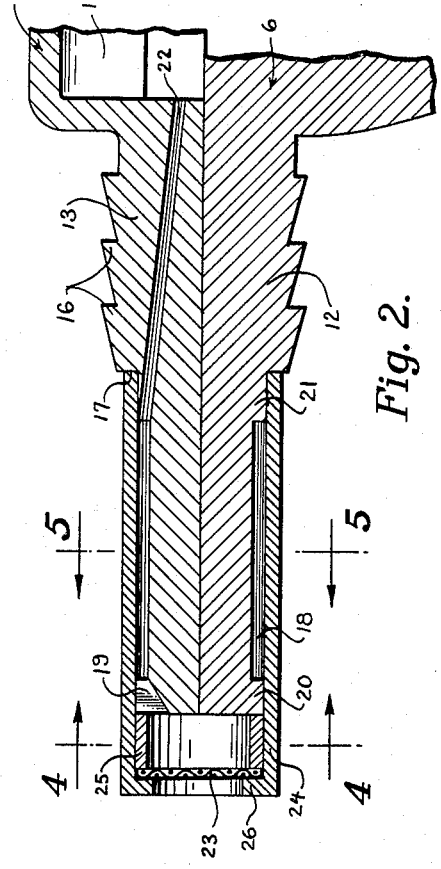
Fig. 2 is an enlarged fragmentary longitudinal vertical section of the assembled stem and atomizing unit of the comb.
Figure 3:
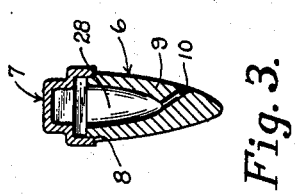
Fig. 3 is a transverse vertical section on line 3—3 of Fig. 1.
Figure 4:
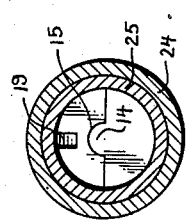
Figure 5:
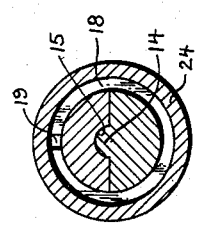

Figs. 4 and 5 are transverse vertical sections on lines 4—4 and 5—5, respectively, of Fig. 2.

Referring to the drawings, the comb proper in the illustrated embodiment, for ease of manufacture, comprises a tooth-bearing member 6 and a back member 7, both preferably molded from a suitable plastic material. The latter is concamerated throughout its length with the shape of the arch being of little moment. In fact, since the back member is normally most easily formed with a uniform back thickness the arch shape is usually determined by the particular external comb design selected. As an example, a shoulder arch is shown in the drawing to produce a flat top and stepped sides. The tooth-bearing member 6 is open at the top throughout the greater part of its length and presents a continuous ledge 8 running along the outer edge of the top portions. The teeth 9 carried by such member are evenly spaced and are hollow throughout a substantial part of their length. The cavity 28 in each tooth is open at the top with the front and back walls thereof substantially parallel and the side walls converging downwardly to meet at a point lying an appreciable distance above the tip of the tooth, thus forming a cavity having an elliptical transverse cross-section and a uniform fore and aft width. Each tooth presents a drilled duct 10 sloping downwardly and laterally from the bottom of the respective cavity 28 with its mouth spaced above the tooth tip.

The comb members 6 and 7 are each prolonged rearwardly by axially extending semicylindrical stem portions 12 and 13, respectively, and these stem portions are provided with a mating tongue and groove 14 and 15. In assembling these described parts, the lower edge of the back member is seated upon the ledge 8 of the tooth-bearing member 6 with the tongue and groove of the stem portions interfitting to form a solid stem and a manifold chamber 11 in the comb body. The two members are permanently bonded in this position to form a fairly large comb of conventional appearance except for the solid stem prolongation and the delivery openings in one side of the teeth. During the molding of the stem portions the forward part thereof is circumferentially ribbed so that the assembled stem presents circumscribing flutes 16, each defined by a gradually sloping back wall and an abrupt forward wall. The remainder of the stem is reduced in diameter by a rearwardly-faced annular shoulder 17, and commencing at a point rearwardly of this shoulder, the stem is circumscribed by a comparatively wide and shallow channel 18 defined between front and rear integral collars 20 and 21, respectively. The rear collar is longitudinally grooved, as at 19, with the floor of the groove sloping upwardly to the channel. Either before or after assembling the comb, the back member 7 is drilled to form a delivery passage 22 extending forwardly from the floor of the channel 18 to the manifold 11. This passage preferably slopes inwardly in a slight degree, and is given a cross-sectional area slightly greater than the throat of the groove 19.

An atomizing unit is provided to thoroughly disperse the powder destined to enter the comb and this unit comprises a screen 23, a sleeve 24, and a spacer 25, the latter two members being preferably formed from a plastic material. The sleeve has an inside diameter corresponding to that of the collars 20 and 21 and is of a length exceeding the distance between the shoulder 17 and the rear extremity of the stem by an amount equal to the sum of the width of the spacer 25 and the thickness of the screen 23. Referring to Fig. 2 it can be seen that the sleeve presents an inturned terminal flange 26. The screen 23 is cut from fine-mesh stock, and the spacer 25 is cut from tubular stock, both the screen and the spacer having a corresponding outside diameter slightly less than the inside diameter of the sleeve. In assembling the atomizing unit, the screen and spacer are inserted through the forward end of the sleeve and are pushed rearwardly until the screen engages the flange 26 and the spacer abuts the screen. The sleeve is then slipped over the stem and pushed forward until it engages the shoulder 17 in which position the spacer abuts the rear collar and functions to hold the screen firmly against the flange. When thus positioned the sleeve encloses the channel to form an annular chamber with the passage 22 and groove 19 serving as front and rear openings thereto. The purpose in sloping the floor of the groove is to preclude the spacer from blocking the mouth thereof. To complete the device, a collapsible bulb 27 of rubber or an equivalent flexible material is then fitted upon the stem with its neck tightly gripping the flutes which function to resist displacement of the bulb.

A fairly tight fit between the sleeve and the collars is desirable to keep the sleeve in position, and in this regard, since the neck of the bulb is larger in diameter than the collars, there is little likelihood of the sleeve being dislodged as the bulb is withdrawn for re-filling purposes. However, the aforesaid arrangement does permit ready removal of the sleeve should it be found necessary to clean the notch or passage.

Before initial use, the bulb is loaded with exterminating powder and is then applied over the stem. The comb is drawn through the animal's hair in a conventional manner, but care should be taken to direct the strokes such that the escape mouths of the ducts lie to the rear as the animal is being combed, and there is then no liability of these ducts becoming clogged from hairs, dirt or other matter picked up from the animal. During the combing strokes a squeezing of the bulb results in the ejection of a fine cloud of powder onto the animal's skin on the trailing side of the comb. This result is explained by the fact that by contraction of the bulb the powder therein is bombarded against the outside of the screen and individual particles of the powder pass through the fine screen openings along with the escaping bulb air which has been compressed by such contraction. The air and powder mixture then passes through the groove 19 and chamber 18, and passage 22 into the hollow back of the comb. Since the throat of the groove is slightly smaller than the passage there will not be a surplusage of powder entering the chamber. The pressurized air-powder mixture feeds from the passage 22 into the manifold 11 to give an even powder distribution to the hollow teeth from whence the powder is ejected from the teeth ducts 10 in a fine cloud directed toward the animal's skin because of the slope of the ducts. The combined flow capacities of these ducts should be made less than that of the passage 22 so that powder clogging of the teeth cannot occur.

When the bulb is released to responsively expand and refill with air, such air is drawn from the atmosphere back through the teeth ducts 10, the passage 22, and groove 19, before reaching the bulb, and these are largely freed by the returning air of any powder lodged therein during the spraying operation. It will be noted that the solid stem serves to give support for the hand while the bulb is being squeezed. Also of considerable import is the action of the screen 23 in breaking up the powder before it leaves the bulb so that it will be delivered from the comb in a fine dispersion.

It is self-evident that various modifications of the invention, along the lines specifically referred to as well as in other respects, may be resorted to without departing from the spirit of my teachings, and I accordingly intend that no limitations be implied and that the hereto annexed claims be given the broadest interpretation to which the employed language fairly admits.

What I claim is:

1. A combination of comb and powder applicator comprising a back member having a manifold chamber therein, teeth extending from the back member and provided with cavities communicating with the manifold chamber and having discharge openings to the atmosphere, a rigid stem extending from the back member, a removable sleeve open at both ends and surrounding a free end portion of the stem, said sleeve extending beyond the free end of the stem, a screen carried by the sleeve and spaced from said free end, said stem providing an inlet from the free end of the stem to the manifold chamber, and a collapsible bulb mounted upon the stem.

2. A combination of comb and powder applicator comprising a back member having a manifold chamber therein, teeth extending from the back member and provided with cavities communicating with the manifold chamber and having discharge openings to the atmosphere, a rigid stem extending from the back member, a removable sleeve surrounding a free end portion of the stem and extending therebeyond, said sleeve presenting an inturned continuous flange at its free end, a screen abutting said flange and held in position by a tubular spacer extending from the screen to the free end of the stem, said stem providing an inlet from the free end of the stem into the manifold chamber and a collapsible bulb having its neck sleeved upon and of an inside diameter larger than the stem.

DANIEL K. TWIET.

References Cited in the file of this patent

UNITED STATES PATENTS

| Number | Name | Date |
|---|---|---|
| 718,054 | Head | Jan. 6, 1903 |
| 1,113,843 | Smith | Oct. 13, 1914 |
| 1,186,697 | Smith | June 13, 1916 |
| 1,252,499 | Scheel | Jan. 8, 1918 |
| 1,858,613 | Bender | May 17, 1932 |
| 1,891,471 | Fotza | Dec. 20, 1932 |
| 2,532,001 | Williams | Nov. 28, 1950 |

FOREIGN PATENTS

| Number | Country | Date |
|---|---|---|
| 441,861 | Great Britain | Jan. 27, 1936 |